United States Patent
Tanaka et al.

(10) Patent No.: US 6,212,817 B1
(45) Date of Patent: Apr. 10, 2001

(54) FLY PATTERN, FABRICATION METHOD AND USE THEREOF

(76) Inventors: Tsutomu Tanaka, 497 Kumagawa, Fussa-shi, Tokyo; Kaoruko Yoshida, Kitano Bldg. 301, 2-71-5 Kotake-cho, Nerima-ku, Tokyo, both of (JP)

( * ) Notice: Subject to any disclaimer, the term of this patent is extended or adjusted under 35 U.S.C. 154(b) by 0 days.

(21) Appl. No.: 09/294,382

(22) Filed: Apr. 20, 1999

(30) Foreign Application Priority Data

Apr. 27, 1998 (JP) .................................. 10-153490

(51) Int. Cl.[7] .................................. A01K 85/08
(52) U.S. Cl. .................. 43/42.25; 43/42.27; 43/42.53
(58) Field of Search .................. 43/42.25, 42.26, 43/42.27, 42.53; D22/128

(56) References Cited

U.S. PATENT DOCUMENTS

| | | | | |
|---|---|---|---|---|
| D. 331,616 | * | 12/1992 | McCoy, Jr. | D22/128 |
| 1,522,185 | * | 1/1925 | Hawes | 43/42.27 |
| 1,734,346 | * | 11/1929 | Reinhardt | 43/42.25 |
| 2,501,723 | * | 3/1950 | Harvey | 43/42.53 |
| 2,586,719 | * | 2/1952 | Ross | 43/42.25 |
| 2,752,720 | * | 7/1956 | Filipiak | 43/42.25 |
| 2,757,476 | * | 8/1956 | Pender | 43/42.25 |
| 5,446,991 | * | 9/1995 | Brackus | 43/42.25 |

FOREIGN PATENT DOCUMENTS

| | | | | |
|---|---|---|---|---|
| 501403 | * | 4/1954 | (CA) | 43/42.53 |
| 930349 | * | 1/1948 | (FR) | 43/42.53 |

OTHER PUBLICATIONS

Selective Trout, A Dramatically New and Scientific Approach to Trout Fishing on Eastern and Western Rivers, by Doug Swisher and Carl Richards, Crown Publishers, Inc., 1971.*

To Rise a Trout, by John Roberts, Stoeger Publishing Company, 1988.*

The Angler's Journal, Summer 1998, vol. 4, No. 3, "Fishing the Rising Sun" by Tsutomo Tanaka, Aug. 1998.*

* cited by examiner

*Primary Examiner*—Darren W. Ark

(57) ABSTRACT

A fly pattern that can fish a rising fish and an educated fish and a fabricating method thereof is provided. The fly pattern is composed of a hook having a head at one end, a bent that curves in the form of U-shape downwardly toward the head at the other end, and a straight shank between the both ends; the shank having a thorax at the head side, a tail portion at the bent side and an abdomen between the thorax and the bent, a first pair of wings attached to an upper side of the thorax, a second pair of wings attached to both sides of the first pair of wings in substantially parallel with the straight shank, and a pair of tails formed at the tail portion.

10 Claims, 3 Drawing Sheets

(a)

(b)

(c)

(d)

(e)

FLY PATTERN, FABRICATION METHOD AND USE THEREOF

BACKGROUND OF THE INVENTION

1. Field of the Invention

The present invention relates to a fly pattern (artificial bait) for a fly fishing that intimates Baetis & Pseudocloeon, and particularly to a fly pattern having upper wings and wings attached to the sides thereof.

2. Description of the Related Art

Recently, a fly fishing that uses a fly pattern (artificial fly) imitating aquatic insects is popular as one of outdoor sports.

The fly fishing is different from a conventional fishing that uses natural baits to capture fishes. Specifically, the fly fishing is a game fishing that an artificial fly is produced in view of a shape, a color, a size or a growth of an aquatic insect that is a bait of an intended fish and is then drifted on the water surface (dry) or drifted under the water surface (nymph) to catch the intended fish in a season and a time when the aquatic insect hatches and without frighten the intended fish. If a casting is bad to fish the intended fish in a flat calm or slow current, the intended fish is very cautious and ignores completely the artificial fly even if it is nearly equal to a real insect. The fly fishing is exactly a sport enjoying a special cheat with a fish. Basically, this angling is performed in a catch and release manner.

The artificial fly imitates various aquatic insects. Typical aquatic insects are may flies, i.e., Baetis & Pseudocloeon. These small may flies are classified into a nymph, a dun and a spinner in accordance with a growth degree.

FIG. 9 shows hatch patterns of the Baetis & Pseudocloeon. In case of Baetis, a nymph rises to a water surface (A), and a back thereof is fissured (A') once the back touches the air to emerge a dun. In case of Pseudocloeon, a nymph hatches at a bottom of water and then rises to a water surface (B). The hatch patterns typically depend on kinds thereof, and may change flexibly depending on areas and geographic states.

The artificial flies imitating Baetis & Pseudocloeon are proposed and produced in accordance with the growth stage.

One of the conventional artificial flies imitating the dun is a no hackle side winder shown in FIG. 10. In FIG. 10, a pair of wings 9 has concave portions that direct outwardly to the abdomen 2. This artificial fly is hard to be fabricated and is easy to be broken. Typically, a duck quill segment is used for wings. The duck quill segment has a preferred shape that has a concave portion, but is hard and heavy and splits easily, although it can return to an initial state.

SUMMARY OF THE INVENTION

The present invention is made to solve the above-described problems. An object of the present invention is to provide a fly pattern that can catch a rising trout and an educated fish, which means a fish that has seen many artificial flies, has been caught and released many times, or can distinguish real aquatic insects (baits) from artificial flies, and a fabricating method thereof.

One aspect of the present invention is a fly pattern comprises a hook having a head at one end, a bend (acute portion) that curves in the form of U-shape downwardly toward the head at the other end, and a straight shank between the both ends; the shank having a thorax at the head side, a tail portion at the bend side and an abdomen between the thorax and the bend, a first pair of wings attached to an upper side of the thorax, a second pair of wings attached to both sides of the first pair of wings in substantially parallel with the straight shank, and a pair of tails formed at the tail portion.

According to the fly pattern of the present invention, the second pair of wings is in the shape of a spoon, and is attached to the shank so that both concave sides of the spoon-shaped wings direct outwardly at an angle of 10° to 45°, preferably 20° to 30°, most preferably 30°. In other words, the second pair of wings are open outwardly at an angle of 30° to the abdomen. Dark dun color hen hackle chip or a bundle of fibers thereof, a natural CDC (Cul-De-Canard) feather and the like are used for the first pair of wings. Teal duck wing pieces are used for the second pair of wings.

Second aspect of the present invention is a method for fabricating a fly pattern comprises the steps of winding a thread around a straight shank of a hook from a head to a tail portion; the hook having the head at one end, a bend that curves in the form of U-shape downwardly toward the head at the other end, and the straight shank between the both ends; the shank having a thorax at the head side, the tail portion at the bend side and an abdomen between the thorax and the bend, attaching a tail at the tail portion with being the bend downwardly, winding the thread around the straight shank from the tail portion to the head, attaching a first pair of wings at an upper side of the thorax, and attaching a second pair of wings at the side of the first pair of wings in substantially parallel with the straight shank.

DETAILED DESCRIPTION OF THE INVENTION

Figure 9:
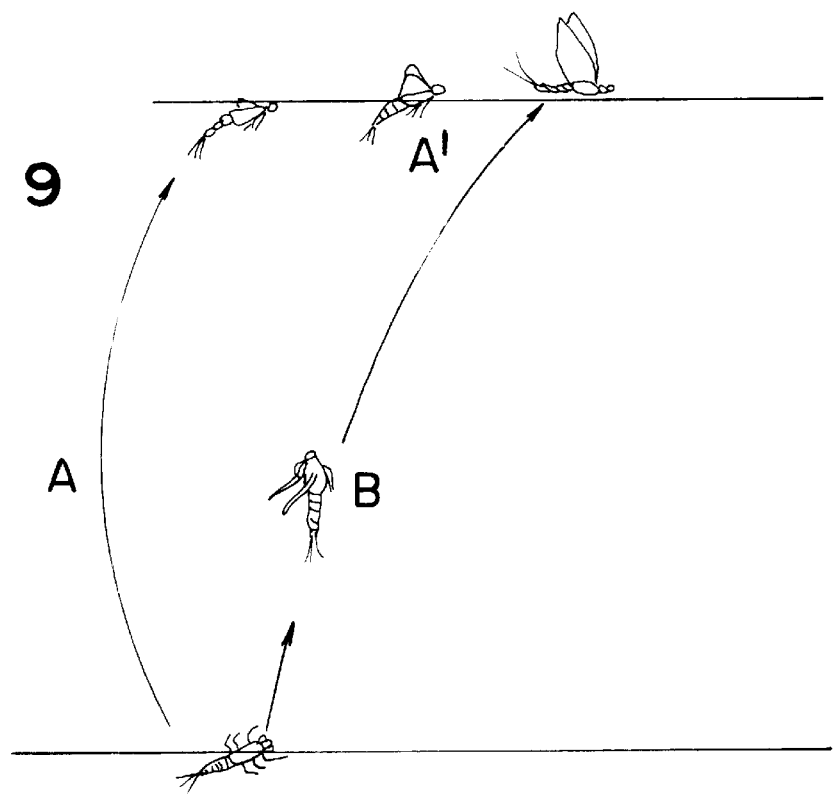
FIG. 9 is a cross-sectional view of hatch patterns of Baetis (left) and Pseudocloeon (right).
Figure 10:
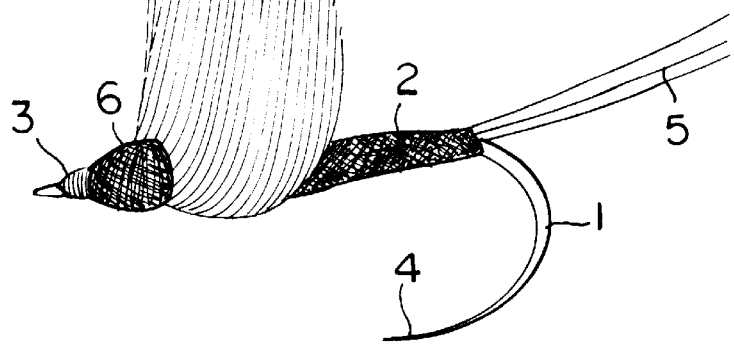
FIG. 10 is a side view of a typical conventional fly pattern.

The artificial fly of the present invention imitates a dun (sub-imago) in a state that the abdomen thereof is supported with a surface tension and floats on a water surface immediately after exuviation on the water surface (or immediately after Baetis & Pseudocloeon exuviated in water emerges out of the water surface) shown in FIG. 9.

In early spring the time when small Baetis & Pseudocloeon, which have a size equal to hook #16 to #22, hatch, a water temperature is low and therefore the surface tension is high. Accordingly, the artificial fly of the present invention having a light weight and a small specific surface area is captured more easily by a water surface film and can keep an intended position as shown in FIG. 9 with a reference character "A".

Alternatively, the artificial fly of the present invention imitates a floating nymph in a state that a dun is pushed out from a nymph reached to a water surface film when an end half body of the artificial fly of the present invention enters into water and is sinking as shown in FIG. 9 with a reference character "A'"

The educated fish loves to eat insects caught in the water surface film that do not fly (for easy to be eaten) with less physical power.

According to the artificial fly of the present invention, even the educated fish can be caught. Needless to say, it is required to use a fine (about 7× or less) nylon line and to do good casting to present the fly first for a fish's view.

The artificial fly of the present invention uses no hackles, thereby diminishing distortion of the water surface caused by the fly as well as light diffusion. CDC wings formed on the artificial fly of the present invention are firstly seen by the fish when the fly flows on the water surface. There is high possibility that the fish recognizes the artificial fly of the present invention as a real Baetis & Pseudocloeon. Thus, the fish is caught effectively. Especially, it is effective for the educated fish eating continuously on the water surface in a flat calm flow.

The artificial fly of the present invention has a small silhouette when floating on the water surface and floats easily due to a use of an oily duck wing. Accordingly, sophisticated *Oncorhynchus masou* (a kind of salmon), *Salvelinus plurius* (char) and the like can be caught effectively on a flat and untrougled water surface (i.e., pool at a downstream).

The artificial fly of the present invention has an excellent balance and therefore does not spin and has light weight.

Furthermore, the artificial fly of the present invention can be fabricated effectively and speedy with less steps.

Embodiments of the present invention are described below referring to figures by way of illustration of the claimed invention, and are not in any way designed to limit its scope. In the figures, same numerals are attached for common parts and double explanation is omitted.

Figure 6:
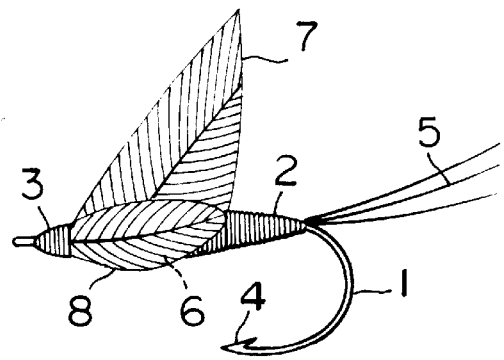
FIG. 6 is a right side view of a fly pattern according to one embodiment of the present invention.

FIG. 1 to FIG. 6 are front, back, plan, bottom, right side and left side views of an embodiment of the fly pattern according to the present invention. In FIG. 6, the fly has a hook 1, an abdomen 2, a head 3, a bend 4, a tail portion 5, a thorax 6, a first pair of wings 7 and a second pair of wings 8.

Figure 1:
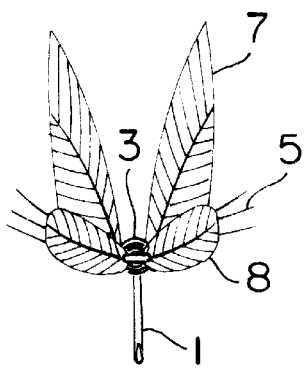
FIG. 1 is a front view of a fly pattern according to one embodiment of the present invention.
Figure 2:
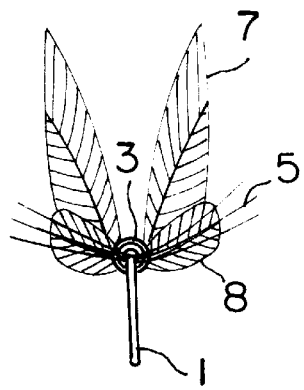
FIG. 2 is a back view of a fly pattern according to one embodiment of the present invention.
Figure 3:
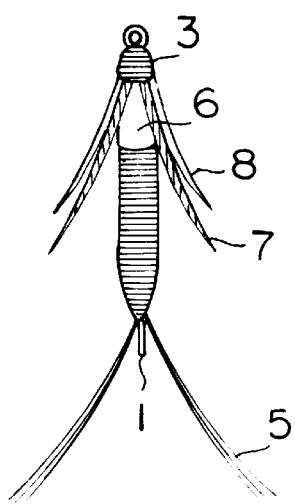
FIG. 3 is a plan view of a fly pattern according to one embodiment of the present invention.
Figure 4:
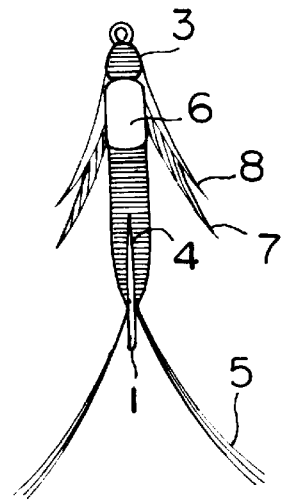
FIG. 4 is a bottom view of a fly pattern according to one embodiment of the present invention.
Figure 5:
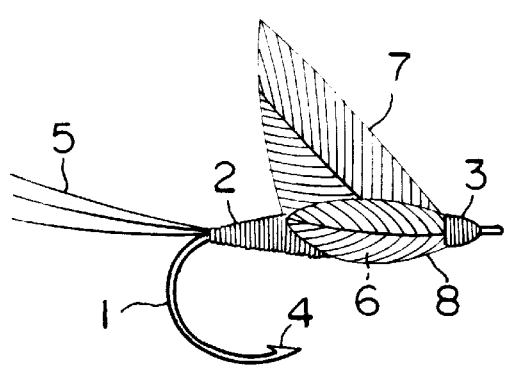
FIG. 5 is a left side view of a fly pattern according to one embodiment of the present invention.

As shown in the bottom view of FIG. 4, the second pair of wings, both right and left wings, are open outwardly and the tail portion is divided to two at an angle of 90°. As shown in each side view of FIG. 5 or 6, the second pair of wings are substantially in parallel with the abdomen 2 and the tail directs upwardly substantially at an angle of 30°.

Figure 7:
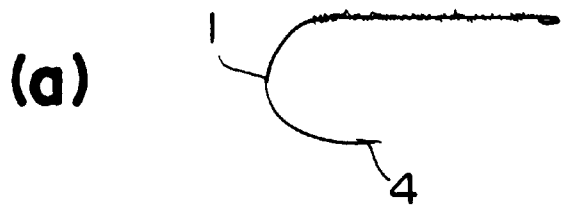
FIGS. 7(a)–(e) is a fabrication process of a fly pattern of the present invention.
Figure 7:
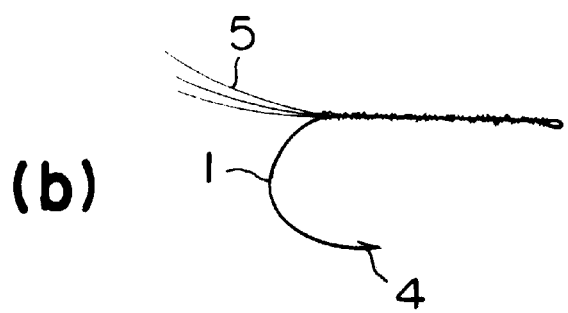
Figure 7:
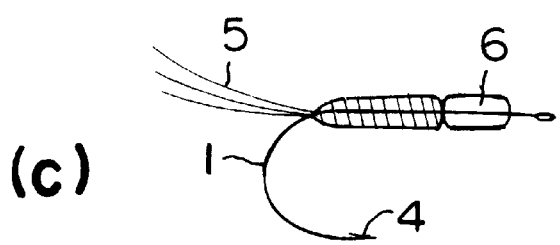
Figure 7:
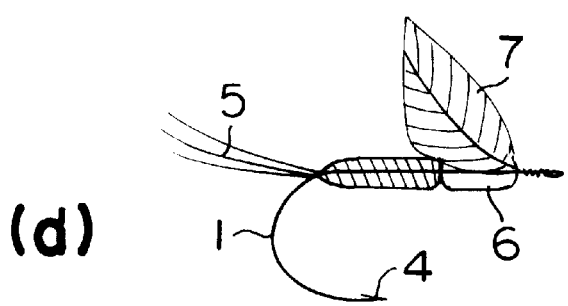
Figure 7:
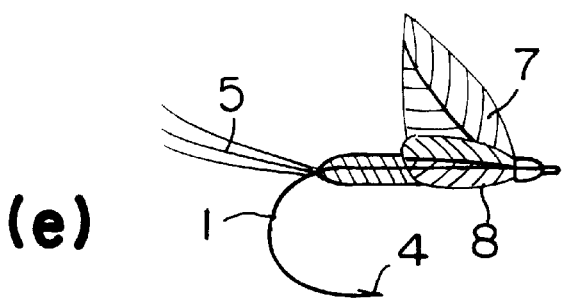
Figure 8:
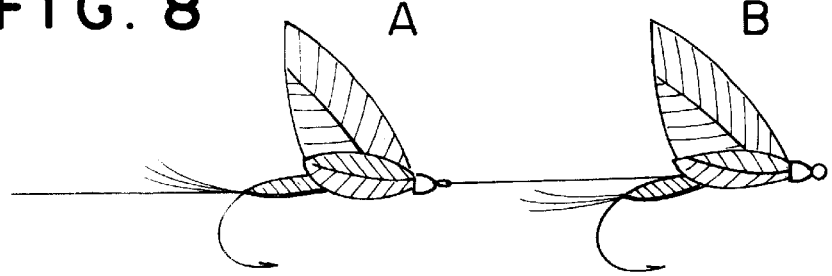
FIG. 8 is a cross-sectional views of floating a fly pattern on a water surface according to the present invention.

FIGS. 7(*a*) to (*e*) show fabrication steps of the fly pattern of the present invention.

The hook 1 manufactured by TIMCO Japan Co., Ltd. under the trade name of TMC101 #16 to #22 (#18 and #22 are a straight eye) is made barbless and a shank thereof is tied up with a dark olive thread (#6/0 to 8/0, Unithread) for Baetis or with a yellow thread #6/0 to 8/0 for Pseudocloeon as shown in FIG. 7(*a*). As the pair of tails 5, dark dun cock hackle is used. The tails are attached to the shank with being the U-shaped bend 4 downwardly as shown in FIG. 7(*b*). As seen from the above, the pair of tails are open at an angle of 90° Dubbing materials for dry flies having a color of a real may fly dun are winded back around the shank from the tail portion to the head to form the abdomen 2 and the thorax 6 as shown in FIG. 7(*c*). The thorax is more darker and thicker than the abdomen. As the first pair of wings, a natural CDC feather, dark dun color hen hackle chip or fibers bundled thereof is used. The first pair of wings is attached to the thorax 6. As the second pair of wings, a right wing feather and a left wing feather are used. The second pair of wings are attached to the shank so that both concave sides of the spoon-shaped wings directed outwardly and the wings are lifted from the shank at angle of approximately 30°.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A fly pattern, comprising:

a hook having a head at one end, a bend that curves in the form of a U-shape downwardly toward the head at the other end, and a straight shank between both ends; the shank having a thorax located behind the head between the ends of the shank, a tail portion located at the other end of the shank and an abdomen between the thorax and the bend, a first pair of wings attached to an upper side of the thorax, a second pair of wings, each wing of said second pair of wings attached to a side of one wing of the first pair of wings which is away from the thorax and each first wing extends at an angle outwardly from the shank of the hook, and a pair of tails formed at the tail portion, wherein the second pair of wings is in the shape of a spoon wherein the concave portion of each wing of the second pair of wings is directed outwardly from the thorax, and wherein the fly pattern has no hackle.

2. A fly pattern according to claim 1, wherein the concave portion of each wing of the second pair of wings extends from the shank at an angle of 10 degrees to 45 degrees.

3. A fly pattern according to claim 1, wherein the concave portion of each wing of the second pair of wings extends from the shank at an angle of 20 degrees to 30 degrees.

4. A fly pattern according to claim 1, wherein the concave portion of each wing of the second pair of wings extends from the shank at an angle of 30 degrees.

5. A fly pattern according to claim 1, wherein the first pair of wings is made of a natural CDC feather, a dark dun color hen hackle chip or fibers bundled thereof.

6. A fly pattern according to claim 1, wherein the second pair of wings are made of feathers from a right wing and a left wing of a teal duck respectively.

7. A fly pattern according to claim 1, which floats on a flat water surface.

8. A fly pattern according to claim 1, which is a dry fly pattern.

9. A fly pattern according to claim 1, which is capable of catching a rising educated fish.

10. A method for fabricating a fly pattern, comprising the steps of:

winding a thread around a straight shank of a hook from one end of the shank to the other end of the shank; the hook having an eye at one end, a bend that curves in the form of a U-shape downwardly toward the eye at the other end, and the straight shank being between both ends; the shank having a thorax located behind the eye between the ends of the shank, a tail portion located at the other end of the shank and an abdomen between the thorax and the bend, attaching a tail at the other end of the shank with the bend being directed downwardly, winding the thread around the straight shank from the other end of the shank to the one end of the shank to form the abdomen and the thorax, attaching a first pair of wings at an upper side of the thorax, and attaching a second pair of wings by attaching each wing of said second pair of wings to a side of one wing of the first pair wings which is away from the thorax and each first wing extends at an angle outwardly from the shank of the hook, wherein the second pair of wings is in the shape of a spoon wherein a concave portion of each wing of the second pair of wings is directed outwardly from the thorax, and wherein the fly pattern has no hackle.

* * * * *